United States Patent [19]

Dafforn et al.

[11] Patent Number: 5,645,363
[45] Date of Patent: Jul. 8, 1997

[54] BEARING CAP AND PUMP MOUNTING FLANGE FOR POWER TAKE-OFF UNIT

[75] Inventors: Richard L. Dafforn, Munith; Wm. David Adams, Chelsea, both of Mich.

[73] Assignee: Dana Corporation, Toledo, Ohio

[21] Appl. No.: 227,971

[22] Filed: Apr. 15, 1994

[51] Int. Cl.$^6$ .................................................. F16B 7/18
[52] U.S. Cl. .................. 403/3; 403/337; 403/335
[58] Field of Search .................. 403/3, 4, 337, 403/336, 335, 181, 182, 183; 74/606 R, 11, 15.86, 15.82, 15.8

[56] References Cited

U.S. PATENT DOCUMENTS

| | | | |
|---|---|---|---|
| 2,735,281 | 2/1956 | Hubert et al. | |
| 2,851,896 | 9/1958 | Ordway | 74/606 R |
| 4,478,593 | 10/1984 | Brown | 464/182 |
| 4,491,755 | 1/1985 | Bertrand | 403/337 X |
| 4,597,301 | 7/1986 | Weis et al. | 74/15.86 |
| 4,610,175 | 9/1986 | Weis et al. | 74/606 R |
| 4,685,341 | 8/1987 | Tanaka et al. | |
| 4,773,277 | 9/1988 | Cook et al. | 74/15.8 X |
| 4,813,290 | 3/1989 | Hone. | |
| 4,824,334 | 4/1989 | Ramsay | 417/360 |
| 5,163,335 | 11/1992 | Isom et al. | 403/3 X |
| 5,228,355 | 7/1993 | Smith et al. | |

FOREIGN PATENT DOCUMENTS

| | | |
|---|---|---|
| 2 178 495 | 2/1987 | United Kingdom. |
| 2 261 488 | 5/1993 | United Kingdom. |

OTHER PUBLICATIONS

Brochure entitled "Chelsea E–Z Shift"; AP–30; printed in the U.S.A.
SAE Standard J744 pp. 40.88–40.93, dated Jul., 1988.
Brochure entitled "Why You Can Depend on Chelsea PTO Technology"; Printed in USA Mar. 1993; AP–319; 136–05426.
Brochure entitled "Innovative Chelsea PTO Technology For Isuzu/Manual Transmissions"; Printed in USA May 1991; AP–308; 136–05332.
Brochure entitled "The Chelsea 488 PTO. 6–Bolt Performance; 8–Bolt Installation" Printed in USA Jun. 1993; AP328; (136–0547).
Brochure entitled "Power When You Need It"; Printed in the USA Mar. 1990; (136–05286) AP305.
Brochure entitled "The PTO Adapter Designed For Set–Back Axles"; Printed in USA (Jan. 1992); AP–311–DSD; 136–05374.
Brochure entitled "The Chelsea 8–Bolt 880 PTO Delivers The Power and Torque You Need For Heavy–Duty Jobs"; Printed in USA Mar. 1992; AP–316; (136–05387).
Brochure entitled "Chelsea Gear Box PTOS"; Copyright, Dana Corporation, 1993; Form No. AP–323; Printed in U.S.A. 136–05445.
Brochure entitled "Chelsea The Power of Revolution"; AP–325; Copyright 1993, Dana Corporation; Printed in the U.S.A.

*Primary Examiner*—Anthony Knight
*Attorney, Agent, or Firm*—MacMillan, Sobanski & Todd

[57] ABSTRACT

A bearing cap used with a power take-off unit includes a body having a relatively large central opening formed through it. A first plurality of apertures is formed through the body of the bearing cap about the periphery of the body to secure it to the housing of the power take-off unit and for securing certain types of driven accessory mounting flanges to the bearing cap. A second plurality of apertures is also formed through the body of the bearing cap about the periphery of the body. The second apertures are provided for securing mounting flanges adapters to the bearing cap to permit certain other types of driven accessory mounting flanges to be secured to the bearing cap. Different bearing caps are provided with differing numbers of these second apertures. The mounting flange adapters have a plurality of apertures formed through them. In the preferred embodiment, the number of apertures formed through the mounting flange adapter is equal to the product of the number of apertures formed through the bearing caps with which it is to be used.

22 Claims, 6 Drawing Sheets

BEARING CAP AND PUMP MOUNTING FLANGE FOR POWER TAKE-OFF UNIT

BACKGROUND OF THE INVENTION

This invention relates in general to power take-off units and in particular to an improved structure for a bearing cap for use with a power take-off unit. This invention also relates to an improved structure for a pump mounting flange for use with a power take-off unit.

Power take-off units are well known mechanical devices which are commonly used on engine driven vehicles for rotatably driving one or more driven accessories, often for industrial and agricultural purposes. In general, a power take-off unit selectively provides a rotatable driving connection between the engine of the vehicle and the driven accessory. To accomplish this, a typical power take-off unit includes an input gear, an output shaft, and a gear set connected between the input gear and the output shaft. The input gear is adapted to be rotatably driven by the vehicle engine, while the output shaft is adapted to be connected to rotatably drive the driven accessory. The gear set provides one or more predetermined speed reduction gear ratios between the input gear and the output shaft. The gear set may also include a clutch for selectively disconnecting the output shaft from the input gear for intermittent operation of the driven accessory.

All of the above components of the power take-off unit are contained within a rigid housing. The input gear is rotatably supported within the housing such that a portion of the input gear extends outwardly through an opening formed through the housing. The housing of the power take-off unit is usually mounted about an opening formed through a case of a transmission of the vehicle. The outwardly extending portion of the input gear extends through the transmission case opening into meshing engagement with one of the transmission gears driven by the vehicle engine. As a result, the input gear of the power take-off unit is constantly rotatably driven by the transmission gear.

The input gear is usually supported for rotation on a non-rotatable idler shaft contained with the housing of the power take-off unit. The ends of the non-rotatable idler shaft are supported within respective openings formed through the housing of the power take-off unit. The ends of the rotatable output shaft, however, are rotatably supported in annular bearings mounted within the housing of the power take-off unit. To facilitate assembly and maintenance, the opposed sides of the housing of the power take-off unit are open, and respective bearing caps are provided for supporting the annular bearings and, therefore, the ends of the output shaft. The bearing caps have central openings formed therethrough which respectively support the annular roller bearings which, in turn, rotatably support the ends of the output shaft. The bearing caps are themselves secured to the housing of the power take-off unit by threaded fasteners which extend through peripheral apertures formed therethrough. In the past, four of such peripheral apertures were usually provided in the bearing cap to accommodate four threaded fasteners.

In many power take-off unit applications, the driven accessory is mounted directly on the housing of the power take-off unit. In those direct mount applications, a mounting surface for the driven accessory is provided on the exterior surface of one of the bearing caps, and a corresponding mounting flange is provided on the driven accessory. A plurality of peripheral apertures are formed through the mounting flange, through which respective threaded fasteners extend. The threaded fasteners secure the driven accessory to the bearing cap which, in turn, is secured to the housing of the power take-off unit.

In some instances, the mounting flange peripheral apertures correspond in number and location to the bearing cap peripheral apertures. In those instances, the four threaded fasteners mentioned above can extend not only through the four bearing cap peripheral apertures, but also through the four mounting flange peripheral apertures. Thus, the same four threaded fasteners can secure not only the bearing cap to the housing of the power take-off unit, but also the driven accessory to the bearing cap.

In other instances, however, the number and location of the mounting flange peripheral apertures are different from the bearing cap peripheral apertures. In those instances, the bearing cap must be formed having additional peripheral apertures to accommodate the threaded fasteners which secure the driven accessory to the bearing cap. As a result, a wide variety of bearings caps are necessary to accommodate a wide variety of mounting flanges. The lack of a single bearing cap structure which can accommodate a variety of mounting flange structures is undesirable for several readily apparent reasons. Thus, it would be desirable to provide an improved structure for a bearing cap for a power take-off unit which can accommodate a variety of mounting flange structures.

Separate and apart from the desirability of providing a single bearing cap structure which can accommodate a variety of mounting flange structures, it has also been found that existing bearing cap structures do not provide sufficient flexibility in adjusting the position of the driven accessory relative to the bearing cap and the power take-off unit. Inasmuch as the power take-off unit is secured to the transmission of the vehicle, it will be appreciated that the physical space available in that area of the vehicle is usually limited. It has been found that some driven accessories cannot be mounted on some vehicles because of a lack of clearance. Thus, it would also be desirable to provide an improved structure for a bearing cap for a power take-off unit which provides greater flexibility in adjusting the position of the driven accessory relative to the bearing cap and the power take-off unit.

SUMMARY OF THE INVENTION

This invention relates to an improved structure for a bearing cap for use with a power take-off unit which can accommodate a variety of mounting flange structures and which provides greater flexibility in adjusting the position of the driven accessory relative to the bearing cap and the power take-off unit. The bearing cap includes a body having a relatively large central opening formed therethrough. A recess is formed in one side of the body about the central opening. A hollow annular protrusion is formed on the body about the central opening. A first plurality of relatively small apertures is formed through the body of the bearing cap about the periphery thereof. The first apertures are provided to secure the bearing cap to the housing of the power take-off unit and for securing certain types of driven accessory mounting flanges to the bearing cap. A second plurality of relatively small apertures is also formed through the body of the bearing cap about the periphery thereof. The second apertures are provided for securing mounting flanges adapters to the bearing cap to permit certain other types of driven accessory mounting flanges to be secured thereto. Different bearing caps are provided with differing numbers of these second apertures. The mounting flange adapters have a plurality of apertures formed therethrough. In the preferred embodiment, the number of apertures formed through the mounting flange adapter is equal to the product of the number of apertures formed through the bearing caps with which it is to be used.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
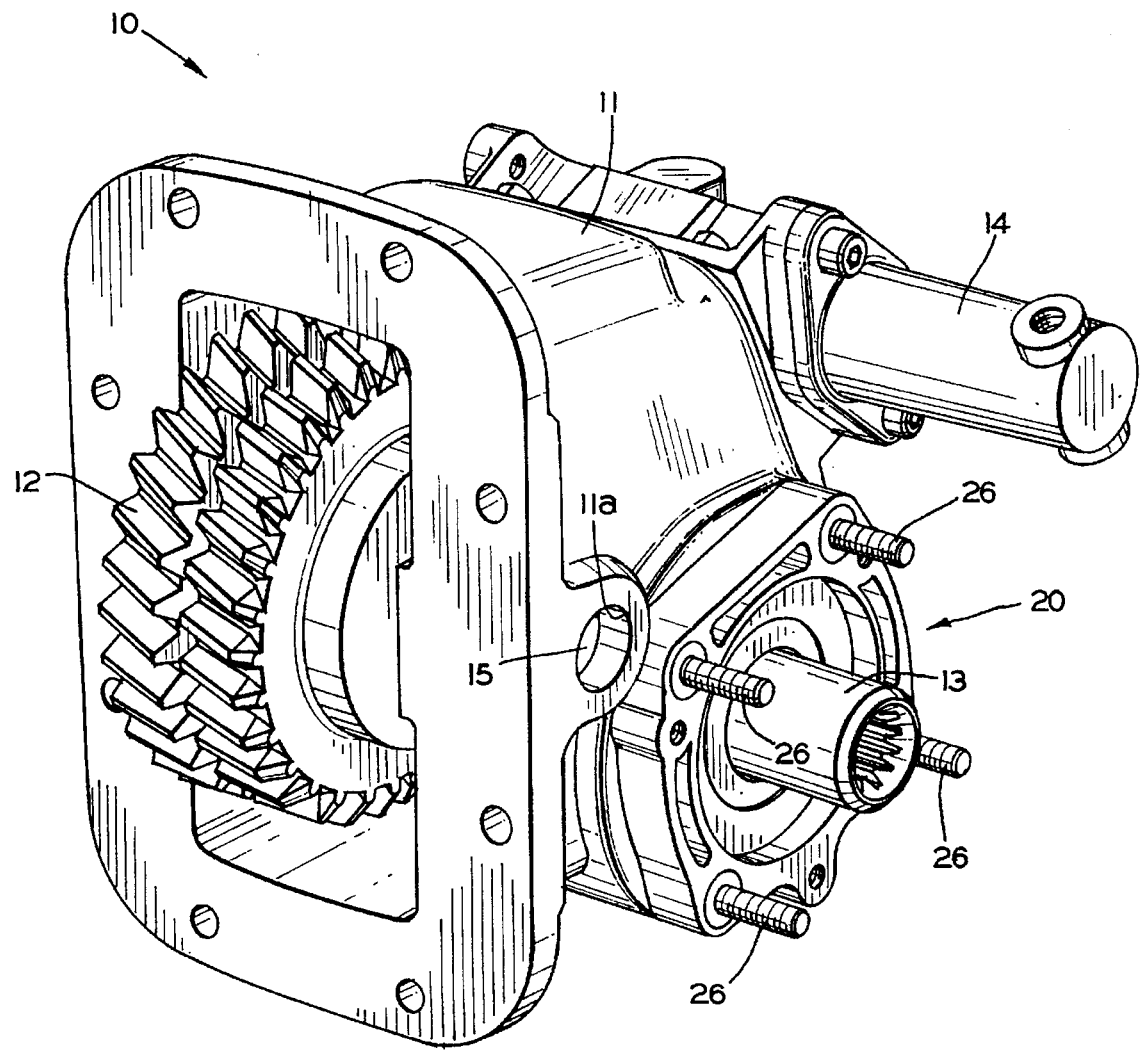
FIG. 1 is a perspective view of a power take-off unit including an improved bearing cap in accordance with this invention.

Referring now to the drawings, there is illustrated in FIG. 1 a power take-off unit, indicated generally at 10, in accordance with this invention. The basic structure and mode of operation of the power take-off unit 10 is well known in the art, and only those portions of the power take-off unit 10 which are necessary for a complete understanding of this invention will be described. The power take-off unit 10 includes a rigid housing 11 which contains an input gear 12 and an output shaft 13. The input gear 12 is adapted to be rotatably driven by an engine (not shown) of a vehicle in a conventional manner. The output shaft 13 is adapted to be connected to rotatably drive a driven accessory (not shown). The output shaft may be hollow and cylindrical in shape, having an inner splined surface for facilitating a rotatable driving connection with the driven accessory.

Between the input gear 12 and the output shaft 13, a gear set (not shown) is provided. The gear set is conventional in the art and provides one or more predetermined speed reduction gear ratios between the input gear 12 and the output shaft 13. A conventional shifting mechanism 14 may be provided for selecting one of the plurality of gear ratios for use. The gear set may also include a clutch for selectively disconnecting the output shaft 13 from the input gear 12 for intermittent operation of the driven accessory.

The input gear 12 is supported for rotation on a non-rotatable idler shaft 15 contained with the housing 11 of the power take-off unit 10. The ends of the non-rotatable idler shaft 15 are supported within respective openings 11a (only one is illustrated) formed through the housing 11 of the power take-off unit 10. The ends of the rotatable output shaft 13, however, are rotatably supported in annular bearings (not shown) mounted within the housing 11 of the power take-off unit 10. The opposed sides of the housing 11 of the power take-off unit are open, and respective bearing caps are provided for supporting the annular bearings and, therefore, ends of the output shaft 13. One of the bearing caps, indicated generally at 20, is the subject of this invention. The structure of the bearing cap 20 will be explained in detail below. The other bearing cap (not shown) is conventional in the art and forms no part of this invention.

Figure 2:
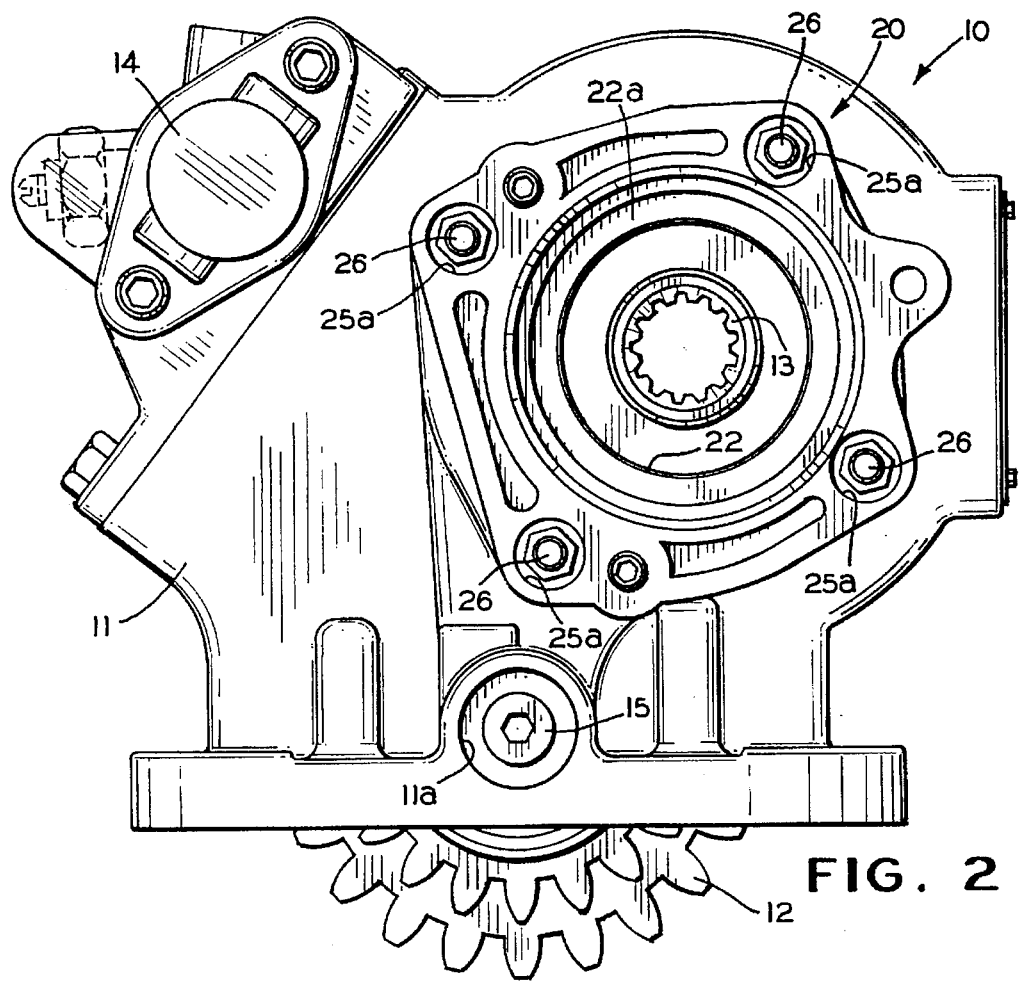
FIG. 2 is a side elevational view of the power take-off unit and bearing cap illustrated in FIG. 1.
Figure 3:
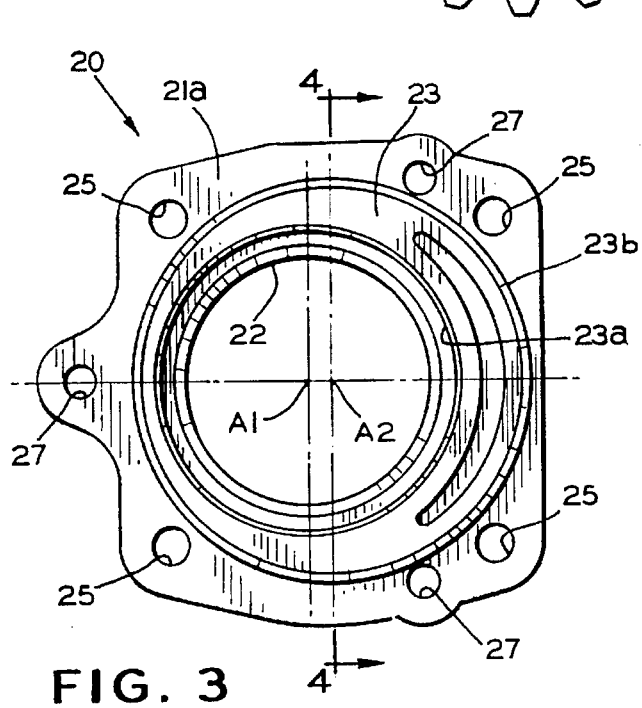
FIG. 3 is an elevational view of the inner side of the bearing cap illustrated in FIG. 2.
Figure 4:
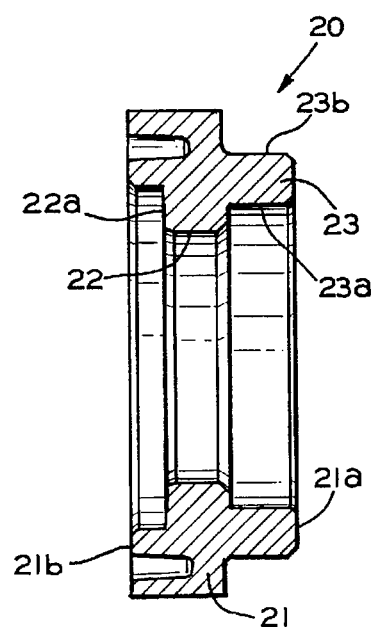
FIG. 4 is a sectional elevational view of the bearing cap illustrated in FIG. 3 taken along line 4—4.

Referring now to FIGS. 2, 3, and 4, the structure of the bearing cap 20 will be explained in detail. The bearing cap 20 includes a body 21 having an inner side 21a and an outer side 21b. When the bearing cap 20 is installed on the housing 11 of the power take-off unit 10, the inner side 21a faces toward the power take-off unit 10 and the outer side 21b faces toward the driven accessory. A relatively large central opening 22 is formed through the body 21 of the bearing cap 20. The central opening 22 extends co-axially with a first axis A1 (see FIG. 3) defined through the power take-off unit 10. When the bearing cap 20 is installed on the housing 11 of the power take-off unit 10, the output shaft 13 extends through the central opening 22 co-axially with the first axis A1. A recess 22a is formed in the outer side 21b of the body 21 about the central opening 22. The recess 22a also extends co-axially with the first axis A1. The purpose of the recess 22a will be explained below.

A hollow annular protrusion 23 is formed on the inner side 21a of the body 21 about the central opening 22. The protrusion 23 is defined by inner and outer circumferential surfaces 23a and 23b, respectively. As best shown in FIG. 3, the inner circumferential surface 23a extends co-axially with the first axis A1 and, therefore with the central opening 22 and the output shaft 13. However, the outer circumferential surface 23b extends co-axially with a second axis A2 (see FIG. 3) which is offset from the first axis A1. The purpose of the hollow annular protrusion 23 and for the eccentricity between the inner and outer surfaces 23a and 23b thereof will be explained below.

A first plurality of relatively small apertures 25 is formed through the body 21 of the bearing cap 20 about the periphery thereof. The first apertures 25 are preferably spaced equidistantly from one another and from the second axis A2 so as to define the four corners of a square, although such spacing is not required. The first apertures 25 are non-threaded and are provided to permit threaded fasteners 26 to extend therethrough into engagement with corresponding threaded apertures (not shown) formed in the housing 11 of the power take-off unit 10. In this manner, the bearing cap 20 may be secured to the housing 11 of the power take-off unit 10. If desired, recesses 25a may be formed in the outer side 21b of the body 21 about each of the first apertures 25 to receive enlarged head portions of the threaded fasteners 26.

A second plurality of relatively small apertures 27 is also formed through the body 21 of the bearing cap 20 about the periphery thereof. The second apertures 27 are preferably spaced equidistantly from one another and from the first axis A1 so as to define the three corners of an equilateral triangle, although such spacing is not required. The second apertures 27 are threaded and are provided for a purpose which will be explained below.

As is known in the art, the end of the housing 11 of the power take-off unit 10 upon which the bearing cap 20 is mounted is formed having an enlarged opening (not shown). The inner diameter of that enlarged opening is slightly larger than the outer diameter of the outer circumferential surface 23b of the annular protrusion 23. Thus, the bearing cap 20 is installed on the housing 11 by inserting and journalling the protrusion 23 within the opening. As mentioned above, the second axis A2 defined by the outer circumferential surface 23b of the annular protrusion 23 is offset from the first axis A1 defined by the central opening 22. As a result, the first axis A1 can be positioned as desired relative to the second axis A2 simply by rotating the bearing cap 20 relative to the housing 11. This known structure is provided to accommodate differing positions of the output shaft 13 resulting from interchanging of the specific gears which make up the gear set of the power take-off unit 10. When a desired relative position of the bearing cap 20 is achieved, the threaded fasteners 26 may be used to secure it to the housing.

Figure 5:
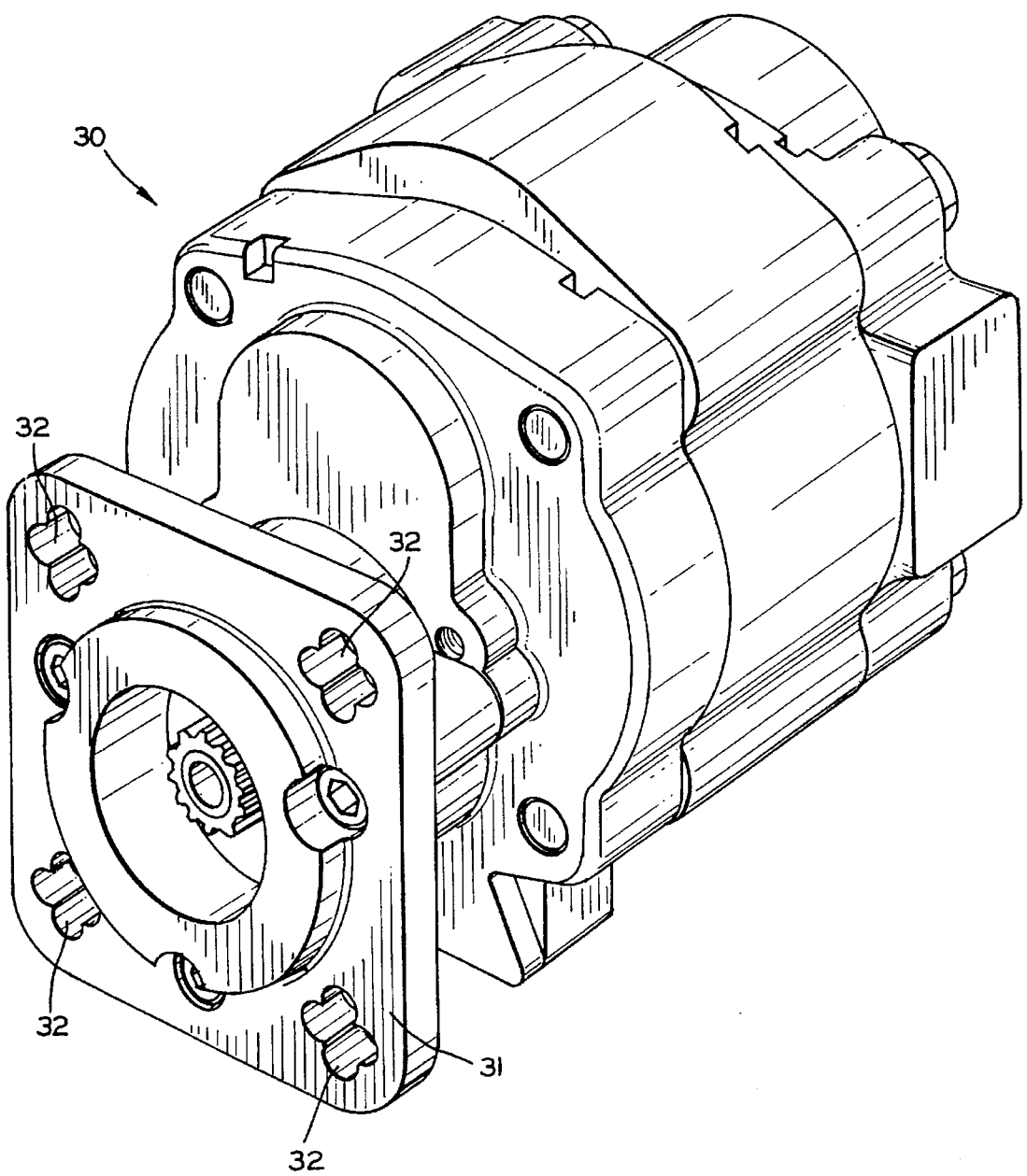
FIG. 5 is a perspective view of a prior art driven accessory adapted to be directly mounted on the bearing cap illustrated in FIGS. 1 through 4.

When installed on the housing 11, the bearing cap 20 is adapted to support a driven accessory on the outer side 21b thereof. The driven accessory may, for example, be embodied as a hydraulic pump, indicated generally at 30 in FIG. 5. As discussed above, a mounting flange 31 is secured to the pump 30 to permit it to be mounted on the bearing cap 20. The illustrated mounting flange 31 has four openings 32 formed therethrough, each of which is generally shaped as a clover-leaf. This mounting arrangement, often referred to as the Chelsea Special mounting flange, is well known in the art. The spacing of the four openings 32 in the Chelsea Special mounting flange 31 corresponds to the spacing of the four apertures 25 formed through the bearing cap 20. Thus, elongated threaded studs (see FIG. 1) may be used as the threaded fasteners 26 discussed above to secure not only the bearing cap 20 to the housing 11 of the power take-off unit 10, but also the mounting flange 31 to the bearing cap 20. Threaded nuts (not shown) may be used with the studs 26 for this purpose. The clover-leaf shape of the openings 32 facilitates the co-axial alignment of the axis of the input shaft (not shown) of the pump 30 with the output shaft 13 of the power take-off unit 10.

When a pump 30 having a Chelsea Special mounting flange 31 is mounted on the bearing cup 20, the second plurality of apertures 27 is not used. However, there are several other types of mounting flanges having openings formed therethrough which do not correspond in number or location with the first plurality of apertures 25. These other mounting flanges cannot be secured to the bearing cap 20 by the same threaded fasteners 26 used to secure the bearing cup 20 to the housing 11 of the power take-off unit 10. Two important mounting flange arrangements are set forth in the Society Of Automotive Engineers Standard J744 dated July, 1988. These two mounting flange arrangements are generally identified as either a two bolt type or a four bolt type. In the two bolt type, the mounting flange of the driven accessory has two bolt holes formed therethrough. Similarly, in the four bolt type, the mounting flange of the driven accessory has four bolt holes formed therethrough. In both cases, the mounting flange of the driven accessory is not compatible with the bearing cap 20 discussed above.

Figure 6:
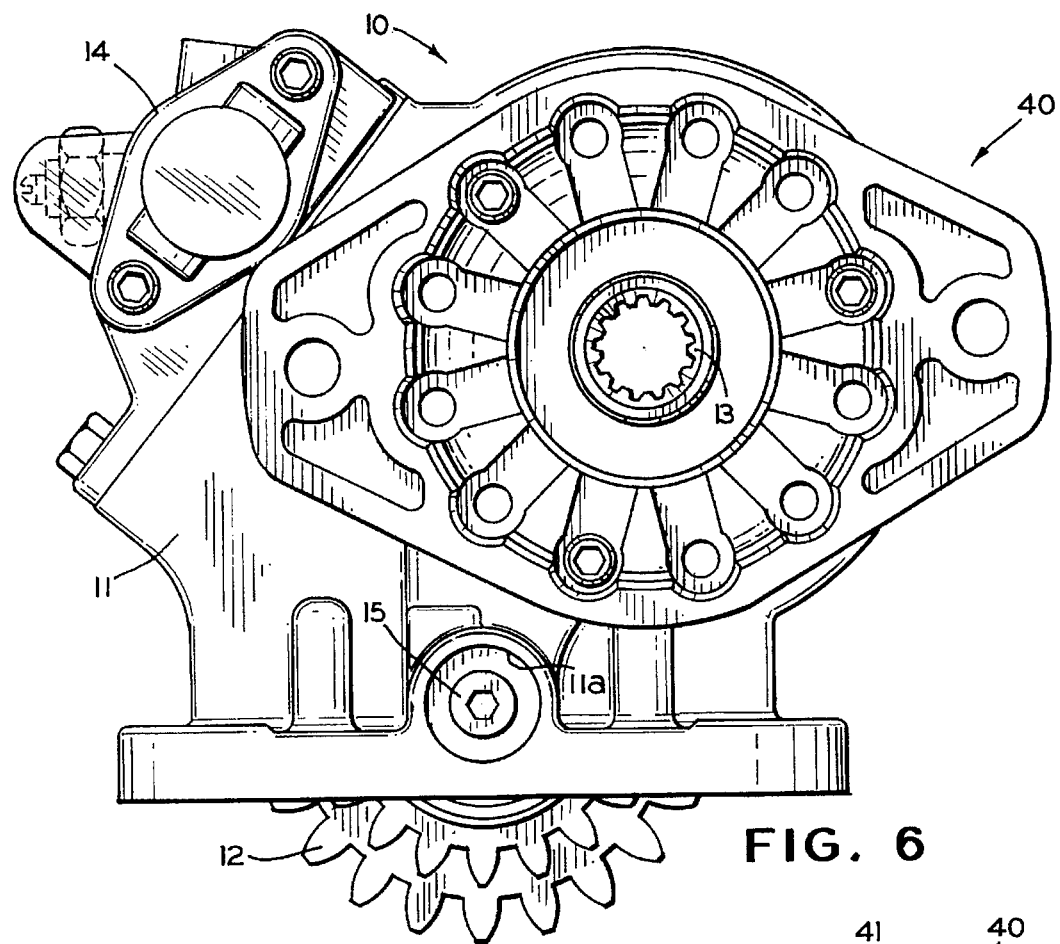
FIG. 6 is a side elevational view of the power take-off unit and bearing cap illustrated in FIG. 1 having a two bolt type mounting flange adapter mounted thereon.
Figure 7:
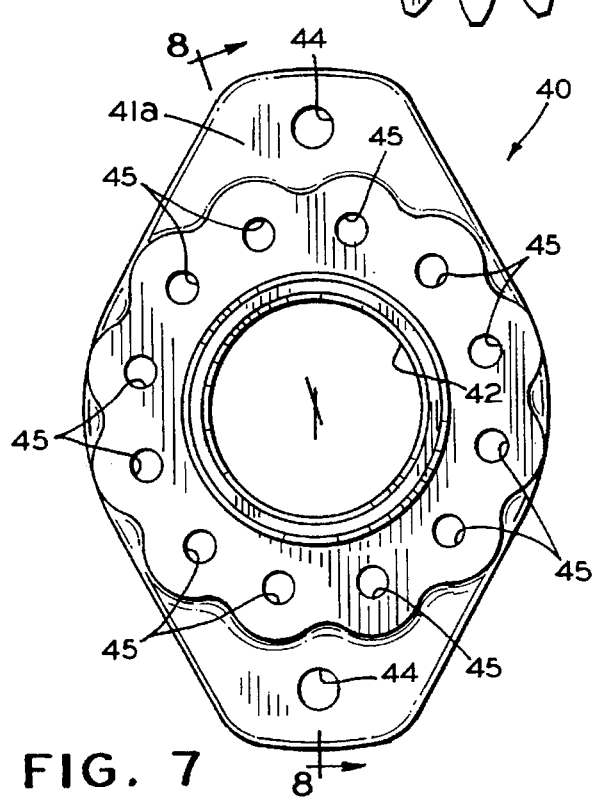
FIG. 7 is an elevational view of the inner side of the two bolt type mounting flange adapter illustrated in FIG. 6.
Figure 8:
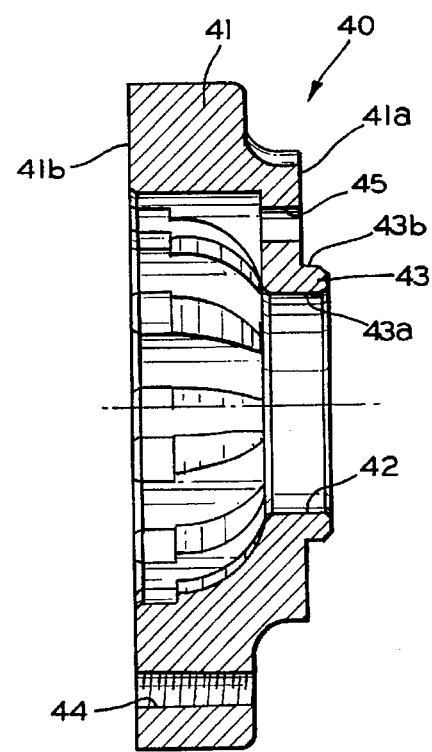
FIG. 8 is a sectional elevational view of the two bolt type mounting flange adapter illustrated in FIGS. 6 and 7 taken along line 8—8 of FIG. 7.
Figure 9:
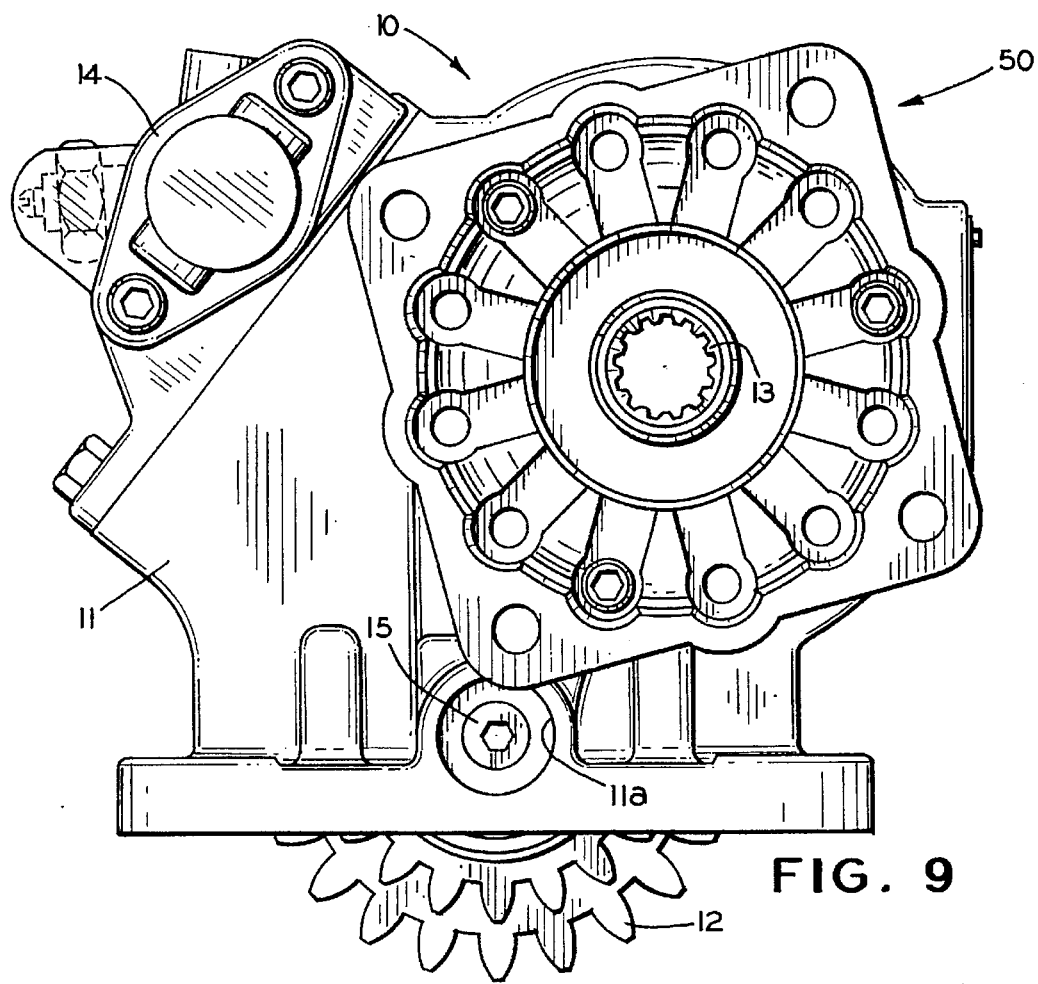
FIG. 9 is a side elevational view of the power take-off unit and bearing cap illustrated in FIG. 1 having a four bolt type mounting flange adapter mounted thereon.
Figures 10, 11:
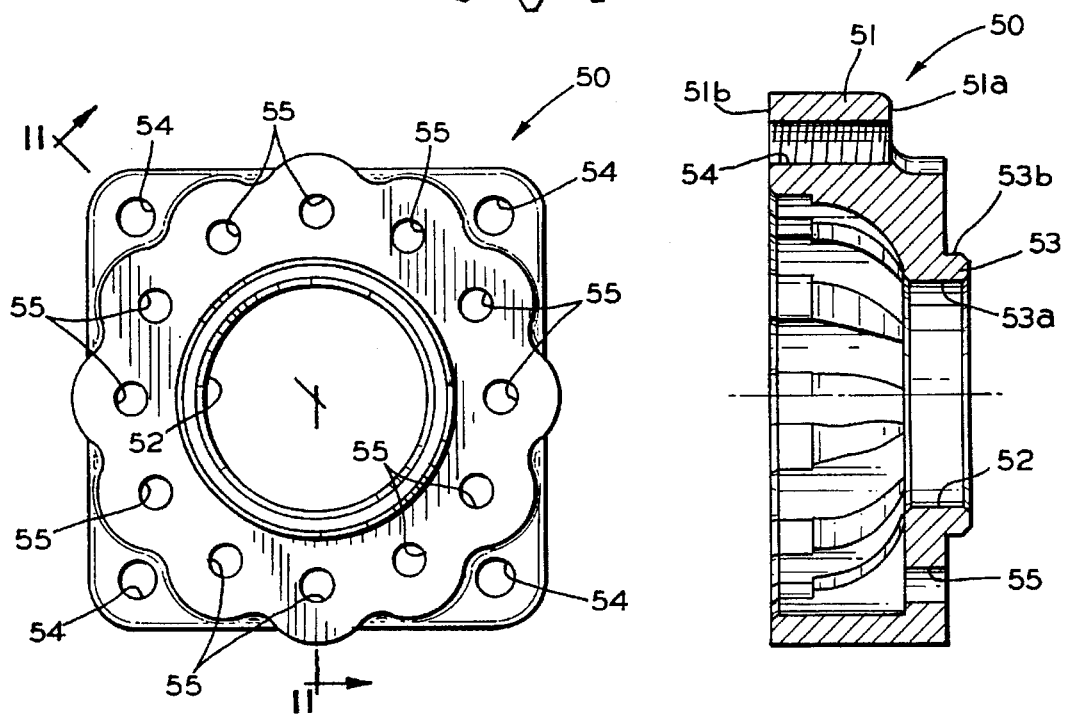
FIG. 10 is an elevational view of the inner side of the four bolt type mounting flange adapter illustrated in FIG. 9.
FIG. 11 a sectional elevational view of the four bolt type mounting flange adapter illustrated in FIGS. 9 and 10 taken along line 11—11 of FIG. 10.

Thus, to accommodate mounting flanges of the two bolt type and four bolt type, this invention contemplates the use of a mounting flange adapter between the bearing cap 20 and the driven accessory. A first embodiment of such a mounting flange adapter, indicated generally at 40 in FIGS. 6, 7, and 8, is adapted for use with the two bolt type mounting flange. A second embodiment of such a mounting flange adapter, indicated generally at 50 in FIGS. 9, 10, and 11, is adapted for use with the four bolt type mounting flange.

Referring first to FIGS. 6, 7, and 8, the two bolt type mounting flange adapter 40 includes a body 41 having an inner side 41a and an outer side 41b. When the mounting flange adapter 40 is installed on the bearing cap 20, the inner side 41a faces toward the power take-off unit 10 and the outer side 41b faces toward the driven accessory. A relatively large central opening 42 is formed through the body 41 of the mounting flange adapter 40. The central opening 42 extends co-axially with the first axis A1 defined through the power take-off unit 10 when the mounting flange adapter 40 is installed on the bearing cap 20. Thus, when the mounting flange adapter 40 is installed on the bearing cap 20, the output shaft 13 extends through the central opening 42 co-axially with the first axis A1.

An annular protrusion 43 is formed on the inner side 41b of the body 41 about the central opening 42. The protrusion 43 has an inner circumferential surface 43a and an outer circumferential surface 43b. The outer circumferential surface 43b is slightly smaller in diameter than the inner diameter defined by the annular recess 22a formed about the central opening 22 of the bearing cap 20. Thus, the mounting flange adapter 40 is installed on the bearing cap 20 by inserting and journalling the protrusion 43 within the recess 22a. The body 41 of the mounting flange adapter 40 further includes a pair of bolt holes 44 formed through the opposed ends thereof. As discussed above, the two bolt holes 44 are arranged to be co-axial with two corresponding bolt holes formed through the mounting flange (not shown) of the driven accessory.

A plurality of relatively small apertures 45 are formed through the body 41 of the mounting flange adapter 40 about the annular protrusion 43. In the preferred embodiment, twelve equidistantly spaced apertures 45 are formed through the body 41, although more or less may be provided. The apertures 45 are radially positioned such that three of such apertures 45 can be simultaneously aligned with the three threaded apertures 27 formed through the bearing cap 20. Consequently, three threaded fasteners (not shown) may be used to secure the mounting flange adapter 40 to the bearing cap 20. Inasmuch as there are twelve equidistantly spaced apertures 45 formed through the mounting flange adapter 40, it will be appreciated that the mounting flange adapter 40 can be secured to the bearing cap 20 in any one of twelve different relative rotational positions. Thus, maximum flexibility is provided in adjusting the position of the driven accessory relative to the bearing cap 20 and the power take-off unit 10.

Referring now to FIGS. 9, 10, and 11, the four bolt type mounting flange adapter 50 includes a body 51 having an inner side 51a and an outer side 51b. When the mounting flange adapter 50 is installed on the bearing cap 20, the inner side 51a faces toward the power take-off unit 10 and the outer side 51b faces toward the driven accessory. A relatively large central opening 52 is formed through the body 51 of the mounting flange adapter 50. The central opening 52 extends co-axially with the first axis A1 defined through the power take-off unit 10 when the mounting flange adapter 50 is installed on the bearing cap 20. Thus, when the mounting flange adapter 50 is installed on the bearing cap 20, the output shaft 13 extends through the central opening 52 co-axially with the first axis A1.

An annular protrusion 53 is formed on the inner side 51b of the body 51 about the central opening 52. The protrusion 53 has an inner circumferential surface 53a and an outer circumferential surface 53b. The outer circumferential surface 53b is slightly smaller in diameter than the inner diameter defined by the annular recess 22a formed about the central opening 22 of the bearing cap 20. Thus, the mounting flange adapter 50 is installed on the bearing cap 20 by inserting and journalling the protrusion 53 within the recess 22a. The body 51 of the mounting flange adapter 50 further includes four bolt holes 54 formed through the opposed ends thereof. As discussed above, the four bolt holes 54 are arranged to be co-axial with four corresponding bolt holes formed through the mounting flange (not shown) of the driven accessory.

A plurality of relatively small apertures 55 are formed through the body 51 of the mounting flange adapter 50 about the annular protrusion 53. In the preferred embodiment, twelve equidistantly spaced apertures 55 are formed through the body 51, although more or less may be provided. The apertures 55 are radially positioned such that three of such apertures 55 can be simultaneously aligned with the three threaded apertures 27 formed through the bearing cap 20. Consequently, three threaded fasteners (not shown) may be used to secure the mounting flange adapter 50 to the bearing cap 20. Inasmuch as there are twelve equidistantly spaced apertures 55 formed through the mounting flange adapter 50, it will be appreciated that the mounting flange adapter 50 can be secured to the bearing cap 20 in any one of twelve different relative rotational positions. Thus, as with the two bolt type mounting flange adapter 50 discussed above, maximum flexibility is provided in adjusting the position of the driven accessory relative to the bearing cap 20 and the power take-off unit 10.

To briefly review, the bearing cap 20 is initially installed on the housing 11 of the power take-off unit 10 and oriented in such a manner that the central opening 22 and the first axis A1 are co-axially aligned with the output shaft 13. As discussed above, the three apertures 27 formed through the bearing cap 20 are located equidistantly from the first axis A1. Thus, when either of the mounting flange adapters 40 and 50 is mounted on the bearing cap 20, the central openings therethrough 42 and 52, respectively, are also co-axially aligned with the first axis A1. Such mounting flange adapters 40 and 50 can be rotated to a number of different orientations relative to the bearing cap 20 while maintaining this co-axial relationship with the first axis A1.

Figure 12:
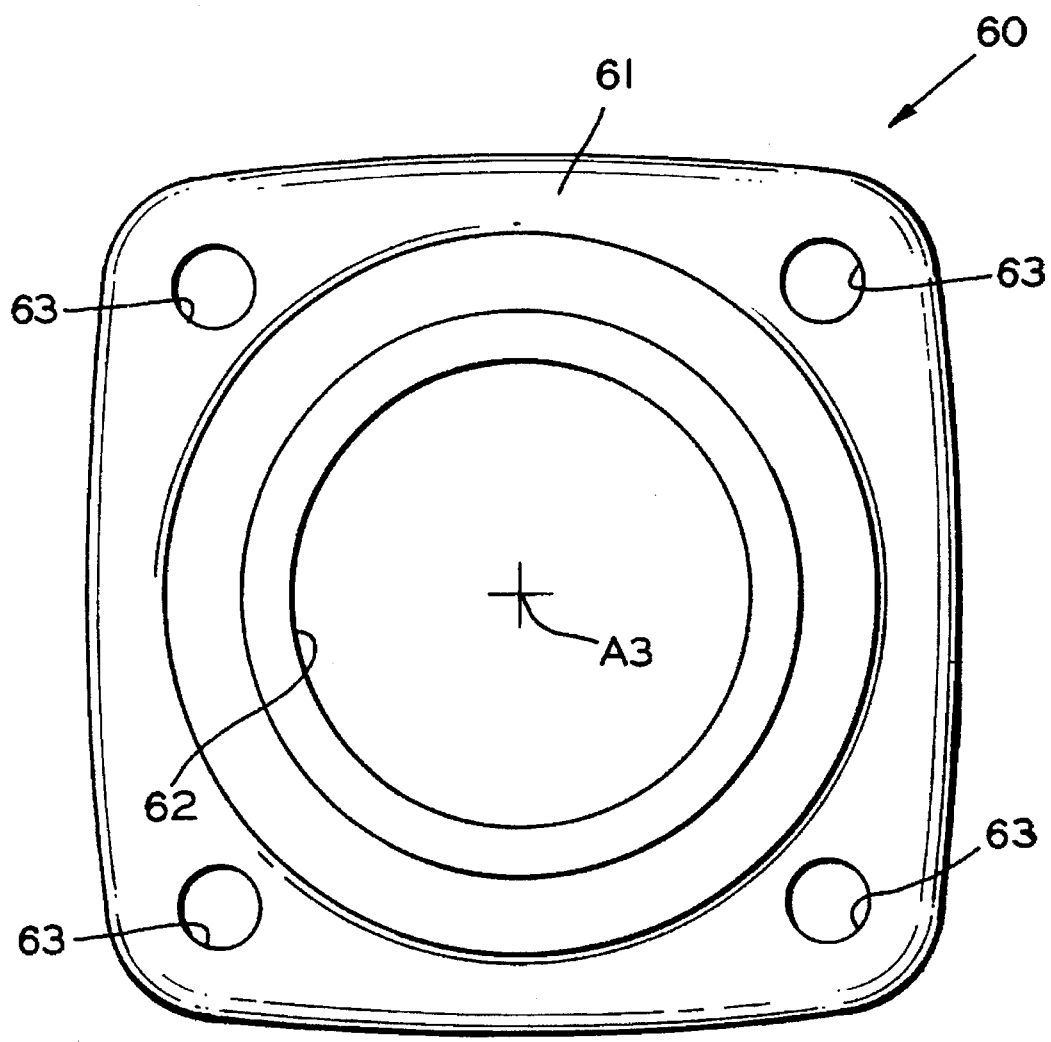
FIG. 12 is an elevational view of a prior art bearing cap.

The mounting flange adapters 40 and 50 can also be used in conjunction with conventional bearing caps, such as generally illustrated at 60 in FIG. 12. The conventional bearing cap 60 includes a body 61 having a central opening 62 and four peripheral apertures 63 formed therethrough. The central opening 62 extends co-axially with an axis A3. The four apertures 63 are spaced equidistantly from one another and from the axis A3 so as to define the four corners of a square.

As discussed above, the apertures 45 and 55 of the mounting flange adapters 40 and 50, respectively, are radially positioned such that three of such apertures 45 and 55 can be simultaneously aligned with the three threaded apertures 27 formed through the bearing cap 20. Similarly, the apertures 45 and 55 are radially positioned such that four of such apertures 45 and 55 can be simultaneously aligned with the four apertures 63 formed through the conventional bearing cap 60. Consequently, four threaded fasteners (not shown) may be used to secure either of the mounting flange adapters 40 or 50 to the conventional bearing cap 60. It will be appreciated that the mounting flange adapters 40 and 50 can be secured to the conventional bearing cap 60 in any one of twelve different relative rotational positions.

Thus, an important aspect of the mounting flange adapters 40 and 50 is that the apertures 45 and 55 formed therethrough are capable of use with bearing caps 20 and 60 having differing numbers of corresponding apertures 27 and 63, respectively. In practice, this can be achieved by providing that the number of apertures 45 and 55 formed through the mounting flange adapters 40 and 50 (twelve in the illustrated embodiment) be equal to the product of the number of apertures formed through each of the bearing caps 20 and 60 (three and four in the illustrated embodiment) with which it is to be used. Such an arrangement will insure not only that the mounting flange adapters 40 and 50 can be used interchangeably with the bearing caps 20 and 60, but also that the mounting flange adapters 40 and 50 can be secured to the bearing caps 20 and 60 in any one of a number of different relative rotational positions. Thus, it will be appreciated that other numbers of the apertures 27 and 63 may be provided, and that the number of apertures 45 and 55 formed through the mounting flange adapters 40 and 50, respectively, will vary with those other numbers.

In accordance with the provisions of the patent statutes, the principle and mode of operation of this invention has been explained and illustrated in its preferred embodiments. However, it must be understood that this invention may be practiced otherwise than as specifically explained and illustrated without departing from its spirit or scope.

What is claimed is:

1. A bearing cap for use in a power take-off unit comprising:
   a body having a relatively large central opening formed therethrough and a protrusion formed about said central opening extending from one side of said body, said central opening defining a first axis, said protrusion having an inner surface which is concentric about said first axis and an outer surface which is concentric about a second axis; and
   a plurality of apertures formed through said body.

2. The bearing cap defined in claim 1 wherein said plurality of apertures includes a first plurality of apertures formed through said body which are spaced equidistantly from a second axis offset from said first axis.

3. The bearing cap defined in claim 2 wherein said plurality of apertures further includes a second plurality of apertures formed through said body which are spaced equidistantly from said first axis.

4. The beating cap defined in claim 1 wherein said first axis and said second axis are substantially parallel.

5. The bearing cap defined in claim 1 wherein said protrusion is formed on a first side of said body, and wherein an annular recess is formed on a second side of said body about said central opening.

6. The bearing cap defined in claim 5 wherein said first side and said second side are located on opposed sides of said body.

7. The bearing cap defined in claim 2 wherein said first plurality of apertures includes four apertures which are equidistantly spaced from one another.

8. The beating cap defined in claim 3 wherein said second plurality of apertures includes three apertures which are equidistantly spaced from one another.

9. The beating cap defined in claim 3 wherein said first plurality of apertures includes four apertures which are equidistantly spaced from one another and said second plurality of apertures includes three apertures which are equidistantly spaced from one another.

10. A power take-off unit for providing a rotatable driving connection between an engine and a driven accessory comprising:

a housing having an opening formed therethrough;

an input gear supported for rotation on said housing and adapted to be rotatably driven by the engine;

a bearing cap including a body having a relatively large central opening formed therethrough and a protrusion formed about said central opening extending from one side of said body, said protrusion being journaled in said housing opening to support said bearing cap on said housing, said central opening defining a first axis, said protrusion having an inner surface which is concentric about said first axis and an outer surface which is concentric about a second axis, said bearing cap further including a plurality of apertures formed through said body;

an output shaft supported for rotation within said bearing cap about said first axis, said output shaft extending from said housing through said central opening of said bearing cap and adapted to be connected to the driven accessory; and a mechanism contained with said housing for connecting said output shaft to rotate with said input shaft.

11. The power take-off unit defined in claim 10 wherein said bearing cap further includes a first plurality of apertures formed through said body which are spaced equidistantly from a second axis offset from said first axis and a second plurality of apertures formed through said body which are spaced equidistantly from said first axis.

12. The power take-off unit defined in claim 11 wherein said first axis and said second axis are substantially parallel.

13. The power take-off unit defined in claim 11 wherein said protrusion is formed on a first side of said body, and wherein an annular recess is formed on a second side of said body about said central opening.

14. The power take-off unit defined in claim 13 wherein said first side and said second side are located on opposed sides of said body.

15. The power take-off unit defined in claim 11 wherein said first plurality of apertures includes four apertures which are equidistantly spaced from one another.

16. The power take-off unit defined in claim 11 wherein said second plurality of apertures includes three apertures which are equidistantly spaced from one another.

17. The power take-off unit defined in claim 11 wherein said first plurality of apertures includes four apertures which are equidistantly spaced from one another and said second plurality of apertures includes three apertures which are equidistantly spaced from one another.

18. A mounting flange adapter assembly adapted for use in a power take-off unit comprising:

a first beating cap having a relatively large central opening formed therethrough and a first number of apertures formed about said central opening;

a second beating cap having a relatively large central opening formed therethrough and a second number of apertures formed about said central opening, said second number of apertures being different from said first number of apertures; and a mounting flange adapter having a relatively large central opening formed therethrough and a third number of apertures formed about said central opening, said third number of apertures being alignable with either said first number of apertures formed through said first beating cap and said second number of apertures formed through said second bearing cap to permit said mounting flange adapter to be connected to either of said first and second beating caps.

19. The mounting flange adapter assembly defined in claim 18 wherein said mounting flange adapter further includes means for supporting a driven device thereon.

20. The mounting flange adapter assembly defined in claim 19 wherein said means for supporting a driven device thereon includes two apertures formed through said mounting flange adapter.

21. The mounting flange adapter assembly defined in claim 19 wherein said means for supporting a driven device thereon includes four apertures formed through said mounting flange adapter.

22. The mounting flange adapter assembly defined in claim 18 wherein said third number of apertures formed through said mounting flange adapter is equal to a product of said first number of apertures formed through said first beating cap and said second number of apertures formed through said second bearing cap.

* * * * *